United States Patent [19]

Schultz et al.

[11] 3,755,162
[45] Aug. 28, 1973

[54] PROCESS FOR PREPARING A MIXTURE OF CYCLOHEXANONEOXIM-CYCLODODECANONEOXIM

[75] Inventors: Hans-Joachim Schultz, Chur Grisons; Ernst Hürlimann, Barnaus; Albert Gehring, Tamins, all of Switzerland

[73] Assignee: Inventa A.G. fur Forschung und Patentverwertung, Zurich, Switzerland

[22] Filed: Mar. 3, 1971

[21] Appl. No.: 120,757

[30] Foreign Application Priority Data
Mar. 13, 1970 Switzerland.......................... 3758/70

[52] U.S. Cl.................................. 252/1, 260/566 A
[51] Int. Cl....................C07c 131/00, C07c 131/02, C07c 131/04
[58] Field of Search..................... 252/1; 260/566 A

[56] References Cited
UNITED STATES PATENTS

| 3,303,216 | 2/1967 | Nitsch | 260/566 |
| 3,429,920 | 2/1969 | Rooij | 260/566 |
| 3,335,183 | 8/1967 | Rooij | 260/566 |
| 3,070,627 | 12/1962 | Bostian et al. | 260/566 |
| 2,820,825 | 1/1958 | Hillyer et al. | 260/566 |
| 3,428,625 | 2/1969 | Strauss | 260/239.3 |

FOREIGN PATENTS OR APPLICATIONS

| 199,776 | 7/1967 | U.S.S.R. | 260/566 A |
| 1,245,944 | 8/1967 | Germany | 260/566 A |
| 4,222,623 | 6/1967 | Japan | 260/566 A |

*Primary Examiner*—George F. Lesmes
*Assistant Examiner*—William R. Dixon, Jr.
*Attorney*—Cecily L. Frey

[57] ABSTRACT

Process for preparing a mixture of cyclohexanoneoxime-cyclododecanoneoxime containing at the most 70 parts by weight of cyclododecanoneoxime, by oximation of cyclohexanone and cyclododecanone with hydroxylamine sulfate, which comprises carrying out the oximation in two stages, the first stage being effected at a pH of 3–4.5 and 80°–90°C, and the second stage at a pH of 5–6 and a temperature of 90°–110°C.

9 Claims, No Drawings

PROCESS FOR PREPARING A MIXTURE OF CYCLOHEXANONEOXIM-CYCLODODECANONEOXIM

The present invention relates to the preparation of a mixture of cyclohexanoneoxime and cyclododecanoneoxime. The novel process consists of a very careful treatment and thus spells an economical way of oximation of cyclohexanone and cyclododecanone in a common operation. The mixture of the oximes so obtained can be rearranged into the corresponding lactam mixture by Beckmann's rearrangement and the two lactams may then either be separated or directly polymerized to a 6/12 copolyamide.

The practical or technical preparation of cyclododecanoneoxime having a melting point of 134°C, as well as that of the dodecalactam obtained by Beckmann's rearrangement, melting point 153°C implies the necessity of using a solvent or melting point depressant due to the high melting points mentioned. Without the aid of such an agent, it is impossible to carry out a continuous technical process for preparing cyclododecanoneoxime and dodeca lactam or at least the process becomes very expensive due to special requirements.- As solvents aliphatic and cycloaliphatic hydrocarbons are known, among other solvents (see DAS 1.269.615, and Brit. Pat. No. 1.126.495). These substances are usually separated by distillation after use, purified, and returned to the process.

Particularly suitable solvents are cyclohexanone and its reaction product cyclohexanoneoxime ( in further processing sometimes also caprolactam). Cyclohexanone is a solvent which during oximation of cyclododecanone is converted into cyclohexanone oxime, which in turn acts as melting point depressant for cyclododecanoneoxime formed from cyclododecanone, so that upon application of certain ratios of the amounts cyclohexanoneoxime/ cyclododecanoneoxime and with certain conditions of oximation, no deposit of solid cyclododecanoneoxime will occur. When Beckmann's rearrangement is made to follow the oximation, with the use of anhydrous mineral acids, a mixture of the corresponding lactams will be formed from the mixture of the oximes, the mixture of lactams separating upon neutralization with aqueous alkali solutions as liquid phase at temperatures between 80° and 100°C due to the melting point depressant influence of caprolactam on dodecalactam.

It is the object of the present invention to provide an improved process for the oximation of cyclododecanone which avoids the inconvenience of the known art of having to separate the inert solvent used heretofore from the reaction product, before returning it into the process, by using instead a solvent which takes part in the oximation. Other advantages will become apparent from the following detailed description.

It is thus the special effect and advantage of the invention that the use of cyclohexanone as solvent in the oximation of cyclododecanone results in the solvent undergoing the same conversion as the substance to be dissolved and that the new compound formed from the solvent has again dissolving or melting point depressant properties. The same is true for the subsequent reactions when applied, namely Beckmann's rearrangement of the oximes and the neutralization of the conversion products. In other words: each of the solvents is at the same time a valuable reaction product, which need not be separated or returned into the reaction.

Due to the requirement of achieving a substantially quantitative conversion of the ketones as well as the hydroxylamine, the technical oximation of cyclododecanone in the presence of cyclohexanone or cyclohexanoneoxime, respectively, that is to say the co-oximation of the two ketones usually occurs in two stages. In the first stage, the ketones are reacted with an insufficient quantity of hydroxylamine, in the second stage on excess of hydroxylamine is used for completion of the oximation of the mixture of ketones. When it is desired to carry out the co-oximation at temperatures up to a maximum of 110°C, the ratio of cyclohexanoneoxime:cyclododecanoneoxime lies preferably between 40:60 and 60:40, (parts by weight). When more than 70 percent by weight of cyclododecanoneoxime are present, the melting point of the mixture is above 110°C. This requires an autoclave and is further disadvantageous because of the thermal instability of cyclododecanoneoxime. 30 parts by weight is the lower limit for cyclohexnoneoxime and 70 parts by weight the upper limit for cyclododecanoneoxime for reasons explained.

It has been found unexpectedly that in the conversion of a mixture of cyclohexanone and cyclododecanone leading to an oxime mixture containing at the most 70 weight percent cyclododecanoneoxime, only or almost only cyclohexanoneoxime will be formed when only 50 percent by weight of the theoretical amount of hydroxylamine are used under conditions which would be suited, per se, for the formation of cyclododecanoneoxime, namely a temperature of 100°C and a pH of 5.0 – 5.5. This finding is surprising for the reason that the discontinuous oximation of a corresponding ketone mixture with an excess of hydroxylamine requires a much shorter reaction time than the cyclododecanone oximation in the absence of cyclohexanone or cyclohexanoneoxime. The exclusive oximation of cyclohexanone observed is obviously due to the different molecular size of the two ketones leading to a highly different reactivity.

Thus, in the above mentioned first oximation stage, the socalled hydroxylamine -deficiency stage, practically only cyclohexanoneoxime is formed. In this stage of the reaction, the presence of cyclododecanone can be infact dispensed with. Regardless of the fact whether a mixture of cyclohexanone/cyclododecanone or cyclohexanone alone is present in that stage, rapid completion of the oximation will lead in any case to the formation of cyclohexanoneoxime alone. In the second oximation stage, in which an excess amount of hydroxylamine is used, as mentioned before, the oximation of cyclododecanone occurs in the presence of cyclohexanoneoxime, the rate of the reaction being favorably affected by that presence.

Essentially the oximation process according to the present invention consists in carrying out the oximation of cyclohexanone in a first stage with hydroxylamine sulfate, and the oximation of cyclododecanone in a second stage. The important advantage of this mode of operation consists therein that part of the oximation process is carried out under milder conditions. This is possible due to the fact that the oximation of cyclohexanone occurs at comparatively mild conditions, namely at temperatures of 80°–90°C at a pH of 3.5–4.5. At 80°C, cyclododecanone is a liquid and will not hinder the oximation of cyclohexanone. However, the oximation of cyclododecanone will only occur at temperatures of 90°–110°C and a pH of 4.5–6 at a sufficiently high speed.

Under the above mentioned conditions of oximation of cyclododecanone, hydroxylamine sulfate is already noticeably instable. However, the stability of the hydroxylamine salt can be markedly improved, that is to say, the loss in substance occurring under the mentioned conditions, can be definitely reduced, when a hydroxylamine sulfate is used, which is free of iron or only contains minute traces thereof. It could not be foreseen or expected that iron ions, e.g., in amounts of 1 ppm/l would catalyse a 20 percent hydroxylamine sulfate solution at 100°C and pH values above 4.5 in a noticeable, let alone a high degree.

The negative influence on the stability of 10 percent solutions of hydroxylamine sulfate caused by traces of iron, dependent on the amount of iron and the pH at a temperature of 100°C, can be seen from the following table.

The figures indicate decomposition in percent of hydroxylamine sulfate after 3 hours.

| Fe ppm/l | pH of solution 4 | 5 | 6 |
|---|---|---|---|
| 0.3 | — | 1.5 | 3.0 |
| 1.7 | — | — | 20.5 |
| 7.5 | — | — | 43.0 |
| 20.0 | 4.5 | — | — |

From the above figures it becomes apparent that the iron contents of the hydroxylamine sulfate solution has great importance under the conditions at which oximation of cyclododecanone takes place. At pH 5–6 and a reaction time of three hours, 1–2 ppm iron cause a considerably higher hydroxylamine sulfate decomposition than 10–20 times as much iron at pH 4. These facts stress the advantage of the process according to the invention where the one oximation is carried out at milder conditions of temperature and pH, since the iron contents of technical hydroxylamine sulfate solutions cannot be decreased to below 1 ppm/l in 20 percent solutions in practice.

The process for preparing a mixed cyclohexanoneoxime/cyclododecanoneoxime according to the invention can be carried out discontinuously and continuously as follows: In the first stage cyclohexanone alone is oximated, regardless whether a mixture of cyclohexanone and cyclododecanone is used or the former only. The reaction is effected with hydroxylamine-sulfate solution at 80°–90°C, preferably 85°C, and a pH of 3–4.5, preferably 3.5–4, within 15–60 minutes, preferably 30 minutes. The hydroxylamine sulfate solution is taken advantageously from the second oximation stage and contains therefore only so much hydroxylamine sulfate that there will be a certain excess of cyclohexanone so that the quantitative conversion of hydroxylamine will be assured. The cyclohexanoneoxime, in which remaining cyclohexanone and cyclododecanone are dissolved, is treated in the second stage of oximation at 90°–110°C, preferably 100°–105°C, during 2 – 4 hours, preferably 3 hours, at a pH 5–6, preferably 5.5, with hydroxylamine sulfate, an excessive amount of the latter being preferred. If only cyclohexanone was used in the first stage, cyclododecanone has to be introduced together with the cyclohexanoneoxime in the second stage. The proportionate amounts of cyclohexanoneoxime/cyclohexanone and cyclododecanone depends on the desired ratio of the two oximes in the final product. This may be at the least 30:70, but is preferably 40:60 – 60:40. As long as the amount of cyclohexanoneoxime is more than 30 percent by weight, any desired ratio can be used, since in that range there is no limit as regards the melting points. The amount of hydroxylamine sulfate in that stage is preferably so chosen that on the one hand the ketone groups present will be completely oximized and, on the other hand, sufficient hydroxylamine sulfate will remain for carrying out the oximation in the first stage, when taking into consideration the decomposition of the salt which is not entirely avoidable. From what has been mentioned above it is clear that the hydroxylamine sulfate solution should be as free as possible of iron ions; it should, for instance, not contain more than 4 ppm/l, and preferably not more than 1 ppm/l.

In the following, the invention will be more fully described in an example, but it should be understood that this is given by way of illustration and not of limitation. Many of the reaction conditions described may be modified within the framework of the disclosure given above without departing from the reported results.

EXAMPLE

Into a vessel A equipped with a stirrer, 36.5 kgs cyclohexanone, 58 kgs cyclododecanone, and 333 kgs of an aqueous hydroxylamine solution containing 10 percent by weight of hydroxylamine sulfate are introduced per hour. The hydroxylamine sulfate solution contains at the most 1 ppm/l iron ions. The hydroxylamine may, for instance, be obtained from an NO-hydrogenation and is obtainable commercially. The oximation reaction takes place at a temperature of 85°C, a pH of 3.5–4.0 during a time of 30 minutes. The time of dwell is so chosen that the hydroxylamine sulfate is converted quantitatively, whereas due to the ketone excess used and the conditions maintained, only about 93 percent of cyclohexanone are converted into cyclohexanoneoxime. The sulfuric acid formed during the reaction is neutralized by continuous addition of ammonia and the pH is maintained at a constant value thereby.

The reaction product which hourly leaves the reaction vessel continuously thus consists of an organic phase containing cyclohexanoneoxime together with unreacted cyclohexanone, as well as cyclododecanone, and a very small quantity of cyclododecanoneoxime, and of an aqueous phase which contains salt, namely dissolved ammonium sulfate alone, being entirely free from hydroxylamine. The separation of the phases is carried out in a separating vessel.

The phase containing cyclohexanoneoxime/cyclohexanone/cyclododecanone is continuously transferred to a second vessel B with stirrer, into which at the same time 317 kgs of a 17.7 weight per cent hydroxylamine sulfate solution are introduced. The iron ion content of that solution is at the most 1 ppm/l. The oximation of the remaining cyclohexanone and of the cyclododecanone is effected at 100°–105°C at a pH of 5.5 The sulfuric acid formed is likewise neutralized with ammonia. After an average of 3 hours dwell, there are no longer any ketones to be found in the organic phase of only small traces. The reaction product leaving the stirring vessel continuously, is separated in a serially connected separator into two liquid phases at 100–105°C. The organic phase consists of cyclohexanoneoxime and cyclododecanoneoxime in a weight ratio of 40:60. The aqueous phase, which contains still 10 weight per cent of hydroxylamine sulfate in addition to ammonium sulfate, serves for continuous introduction into the stirring vessel A.

When the oximation is carried out in both stages with a hydroxylamine sulfate solution containing 6 ppm/l of iron ions, all other conditions being equal, 420 kgs of hydroxylamine sulfate solution of the same concentration are required for the quantitative conversion of the ketones. In other words, about 30 percent more hydroxylamine sulfate is consumed due to the decomposition of the salt caused by the higher iron content.

While the invention has been illustrated in a single example, it will be obvious to the expert that changes in the details will not interfere with the spirit of the invention as set forth in the appended claims.

What we claim is:

1. Process of forming a mixture of cyclohexanone oxime and cyclododecanone oxime containing a maximum of about 70 percent by weight of cyclododecanone which comprises, in a first stage, contacting cyclohexanone with an amount of hydroxylamine sulphate insufficient to effect oximation of all the cyclohexanone present, at a temperature between about 80° and about 90° C. and a pH between about 3 and about 4.5, and in a second stage, incorporating in the oximation solution an amount of cyclododecanone sufficient to produce the aforementioned percentage of cyclododecanone oxime, and in the presence of an excess of hydroxylamine sulphate over that required for the oximation of the cyclododecanone, forming cyclododecanone oxime at a temperature between about 90° and about 110° C. at a pH between about 5 and about 6, whereby the cyclohexanone oxime formed in the first stage acts to maintain the cyclododecanone oxime in solution.

2. The process according to claim 1, wherein the first stage is carried out for 15–60 minutes and the second stage for 2–4 hours.

3. The process according to claim 2, wherein the first stage is carried out for 30 minutes and the second stage for 3 hours.

4. The process according to claim 1, wherein the first stage is carried out at a pH of 3.5–4 and a temperature of 85°C.

5. The process according to claim 1, wherein the second stage is carried out at a pH of 5.5 and a temperature of 100°–105°C.

6. The process according to claim 1, wherein the hydroxylaminesulfate solution does not contain more than 4 ppm/l iron ions.

7. The process according to claim 1, wherein the hydroxylamine sulfate solution does not contain more than 1 ppm/l iron ions.

8. The process according to claim 1, wherein the remaining hydroxylamine solution is re-used in the first stage for oximation.

9. The process according to claim 1, wherein the cyclododecanone is introduced and is present in the first stage.

* * * * *

UNITED STATES PATENT OFFICE
CERTIFICATE OF CORRECTION

Patent No. 3,755,162  Dated Aug. 28, 1973

Inventor(s) Hans-Joachim Schultze et al

It is certified that error appears in the above-identified patent and that said Letters Patent are hereby corrected as shown below:

Below the line United States Patent [19]

"Schultz et al" should read -- Schultze et al --;

In the first line of [75] Inventors:

"Schultz" should read -- Schultze --;

In the second line of that paragraph, change

"Barnaus" to -- Domat-Ems, Grisons. --.

Signed and sealed this 14th day of May 1974.

(SEAL)
Attest:

EDWARD M. FLETCHER, JR.
Attesting Officer

C. MARSHALL DANN
Commissioner of Patents